(12) United States Patent
Pamplin

(10) Patent No.: US 11,758,930 B1
(45) Date of Patent: Sep. 19, 2023

(54) REFILLABLE CARBONATION CONTAINER

(71) Applicant: BlendJet Inc., Benicia, CA (US)

(72) Inventor: Ryan Michael Pamplin, San Juan, PR (US)

(73) Assignee: BlendJet Inc., Benicia, CA (US)

( * ) Notice: Subject to any disclaimer, the term of this patent is extended or adjusted under 35 U.S.C. 154(b) by 0 days.

(21) Appl. No.: 17/672,310

(22) Filed: Feb. 15, 2022

(51) Int. Cl.
| | |
|---|---|
| *A23L 2/54* | (2006.01) |
| *B01F 23/2361* | (2022.01) |
| *B65B 3/04* | (2006.01) |
| *A23L 2/40* | (2006.01) |

(52) U.S. Cl.
CPC .............. *A23L 2/54* (2013.01); *A23L 2/40* (2013.01); *B01F 23/23611* (2022.01); *B65B 3/04* (2013.01)

(58) Field of Classification Search
CPC ........ B01F 23/23611; A23L 2/40; A23L 2/54; B65B 3/04
USPC ....................................................... 99/323.1
See application file for complete search history.

(56) References Cited

U.S. PATENT DOCUMENTS

| | | | | |
|---|---|---|---|---|
| 4,610,282 A * | 9/1986 | Brooks | ............... | B01F 23/2361 426/477 |
| 5,270,069 A * | 12/1993 | Plester | ................. | B67D 1/1405 426/124 |
| 5,870,944 A * | 2/1999 | Vander Zalm | ...... | B01F 23/2361 261/DIG. 7 |
| 6,216,913 B1 * | 4/2001 | Bilskie | ................. | B67D 1/1247 222/400.7 |
| 6,669,051 B1 * | 12/2003 | Phallen | ..................... | B67C 3/28 222/394 |
| 7,832,142 B1 * | 11/2010 | Olson | .................... | A01G 31/02 239/70 |
| 8,985,395 B2 * | 3/2015 | Tansey | ............... | G06Q 30/0269 222/146.6 |
| 9,687,796 B2 * | 6/2017 | Hoare | ................. | B01F 35/2112 |
| 10,512,358 B1 * | 12/2019 | Perrelli | ..................... | A45F 3/18 |
| 10,863,852 B1 * | 12/2020 | Lyons | ................. | B01F 35/2112 |
| 2003/0173376 A1 * | 9/2003 | Bilskie | ................. | B67D 1/0406 222/129.1 |
| 2006/0113323 A1 * | 6/2006 | Jones | .................... | B67D 1/0021 222/129.1 |
| 2008/0217363 A1 * | 9/2008 | Vitantonio | ........... | B67D 1/1281 222/399 |
| 2013/0062366 A1 * | 3/2013 | Tansey | ................. | B67D 1/0809 222/101 |
| 2014/0079856 A1 * | 3/2014 | Hatherell | ............. | B67D 1/0406 426/477 |
| 2014/0175125 A1 * | 6/2014 | Breault | ................ | B67D 1/0078 222/129.1 |
| 2015/0353335 A1 * | 12/2015 | Breault | ................ | B67D 1/0021 222/129.1 |
| 2017/0088410 A1 * | 3/2017 | Wing | .................... | B67D 1/0022 |
| 2018/0085763 A1 * | 3/2018 | Leckner | .................... | B05B 1/16 |
| 2019/0330045 A1 * | 10/2019 | Breault | ................ | B67D 1/0058 |

\* cited by examiner

*Primary Examiner* — Eric S Stapleton
(74) *Attorney, Agent, or Firm* — ESPLIN & ASSOCIATES, PC

(57) ABSTRACT

A refillable carbonation container is disclosed. Exemplary implementations may include a base, a tank, a container body, a dispenser, and/or other components. The tank holds a pressurized liquid, such as $CO_2$. The container body holds a potable liquid, such as water. The dispenser dispenses the pressurized liquid from the tank into the potable liquid, which provides carbonation of the potable liquid.

17 Claims, 6 Drawing Sheets

REFILLABLE CARBONATION CONTAINER

FIELD OF THE DISCLOSURE

The present disclosure relates to a refillable carbonation container, or, in other words, a refillable container assembly configured to hold and carbonate liquids.

BACKGROUND

Carbonated liquids are common and known, including but not limited to carbonated water and other drinks. Different mechanisms are known to carbonate a liquid, including but not limited to consumer appliances that can carbonate drinking bottles.

SUMMARY

One aspect of the present disclosure relates to a refillable carbonation container configured to hold and carbonate liquids. The carbonation container can be filled and refilled with pressurized liquid (including but not limited to $CO_2$, or combinations that include $CO_2$), which can in turn be used anywhere (e.g., on-the-go) to carbonate potable liquid (including but not limited to water and other drinks). As used herein, both fluids and gases, including $CO_2$, are referred to as liquids. The refillable carbonation container may be portable due to its size. A user can take the refillable carbonation container anywhere and create and enjoy carbonated beverages.

The refillable carbonation container may include a base, a (pressurized) tank, a container body, a (rotatable) dispenser, a control interface, and/or other components. In some implementations, the refillable carbonation container may include one or more of a conduit, a (controllable) valve, a cap, control circuitry, an electrical motor, a rechargeable battery, and/or other components.

Another aspect of the present disclosure is a method for holding and carbonating liquid in a refillable carbonation container. The method may include receiving, through a control interface included in the refillable carbonation container, user input from a user to initiate carbonation of the liquid in the refillable carbonation container. The method may include holding, by a container body included in the refillable carbonation container, a particular volume of liquid. The container body has a longitudinal axis. The method may include holding, by a tank included in the refillable carbonation container, a pressurized liquid. The tank has a tank volume. The tank volume of the tank holds an amount of the pressurized liquid that is sufficient to support at least three separate and distinct instances of the carbonation, such that the user can control carbonating at least three times the particular volume of liquid using the amount of pressurized liquid held in the tank volume of the tank. The method may include rotating a rotatable dispenser around the longitudinal axis. In some implementations, the rotatable dispenser may include at least one outlet that is disposed at least 10 mm from the longitudinal axis such that the at least one outlet moves in a circle during rotation of the rotatable dispenser. In some implementations, the circle has a diameter of at least 20 mm. The method may include coupling, by a conduit included in the refillable carbonation container, the tank to the rotatable dispenser. The method may include transferring, by a controllable valve included in the refillable carbonation container, the pressurized liquid in the tank to the at least one outlet of the rotatable dispenser. In some implementations, the refillable carbonation container includes a non-rotating dispenser. The pressurized liquid, upon exiting out of the at least one outlet, carbonates the particular volume of liquid held in the container body, thereby creating a solution within the container body of the pressurized liquid and the liquid.

As used herein, any association (or relation, or reflection, or indication, or correspondency) involving tanks, containers, dispensers, outlets, conduits, valves, and/or another entity or object that interacts with any part of the refillable carbonation container and/or plays a part in the operation of the refillable carbonation container, may be a one-to-one association, a one-to-many association, a many-to-one association, and/or a many-to-many association or "N"-to-"M" association (note that "N" and "M" may be different numbers greater than 1).

As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
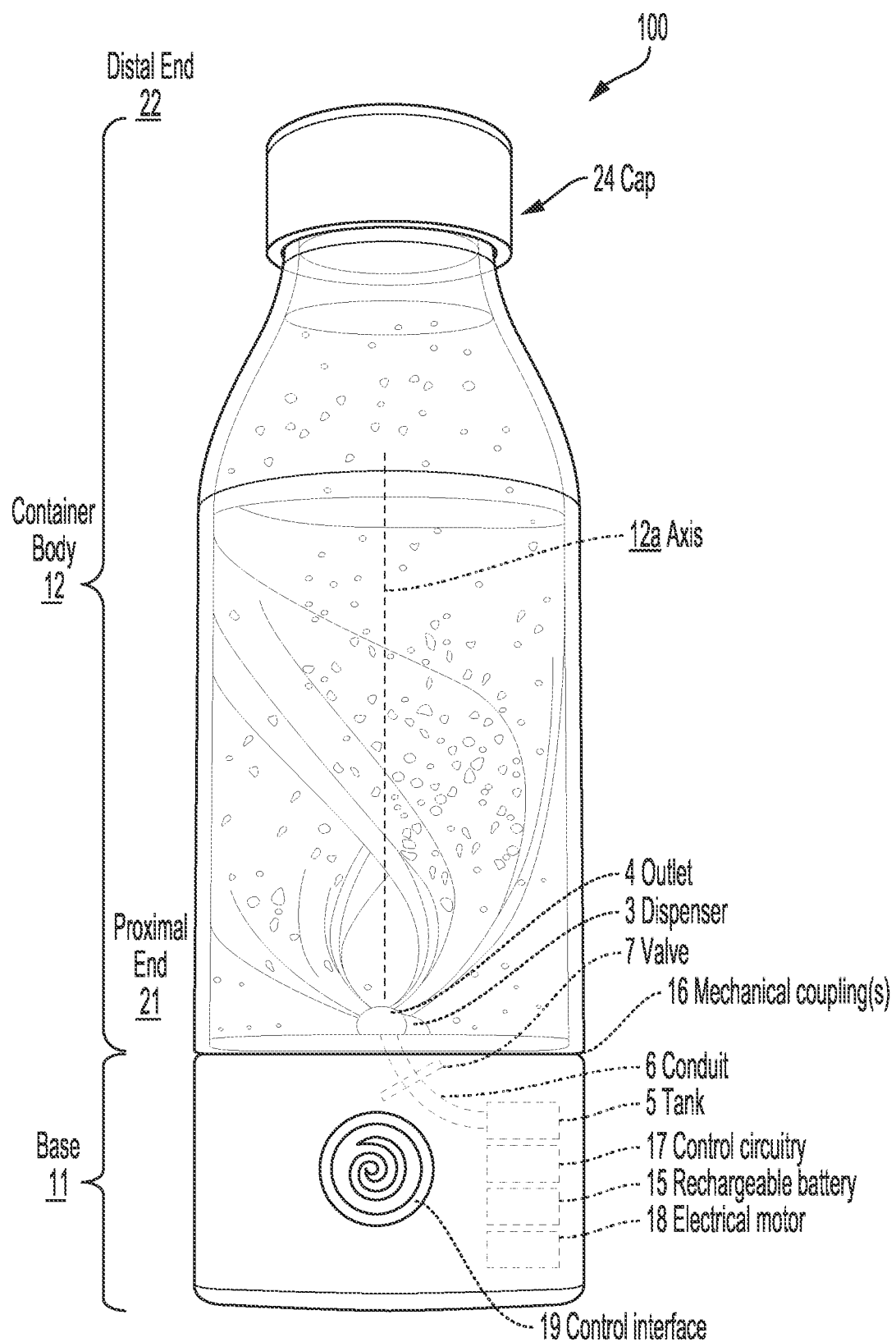
FIG. 1 shows a front view of a refillable carbonation container configured to hold and carbonate liquids, in accordance with one or more implementations.

FIG. 1 shows a refillable carbonation container 100 (also referred to as container 100) configured to hold and carbonate liquids, in accordance with one or more implementations. Container 100 may include one or more of a base 11, a tank 5 (depicted in FIG. 1 as a dotted rectangle to indicate this component may be embedded within base 11, and not readily visible from the outside), a container body 12, a (rotatable) dispenser 3, a conduit 6 (depicted in FIG. 1 as a dotted rectangle to indicate this component may be embedded within base 11, and not readily visible from the outside), a (controllable) valve 7 (depicted in FIG. 1 as a dotted rectangle to indicate this component may be embedded within base 11, and not readily visible from the outside), a control interface 19, an electrical motor 18 (depicted in FIG. 1 as a dotted rectangle to indicate this component may be embedded within base 11, and not readily visible from the outside), a rechargeable battery 15 (depicted in FIG. 1 as a dotted rectangle to indicate this component may be embedded within base 11, and not readily visible from the outside), control circuitry 17 (depicted in FIG. 1 as a dotted rectangle to indicate this component may be embedded within base 11, and not readily visible from the outside), one or more couplings 16, and/or other components. As depicted in FIG. 1, during carbonation, rotational movement of dispenser 3 may cause the liquid held in container body 12 to rotate and/or swirl as well.

Base 11 and container body 12 may be configured to be coupled during operation or use of container 100. For example, in some implementations, base 11 and container body 12 may be mechanically coupled, e.g., through one or more (threaded) mechanical couplings 16. Other types of couplings may be envisioned for container 100, though leak-proof options may be preferred, since typical uses include liquids. In some implementations, control circuitry 17 and/or other components may be included in base 11, e.g., completely or partially within base 11. For example, one or more of tank 5, control circuitry 17, electrical motor 18, rechargeable battery 15, conduit 6, valve 7, and/or other components may be integrated permanently into base 11 such that base 11 forms an integral whole.

Figure 5:
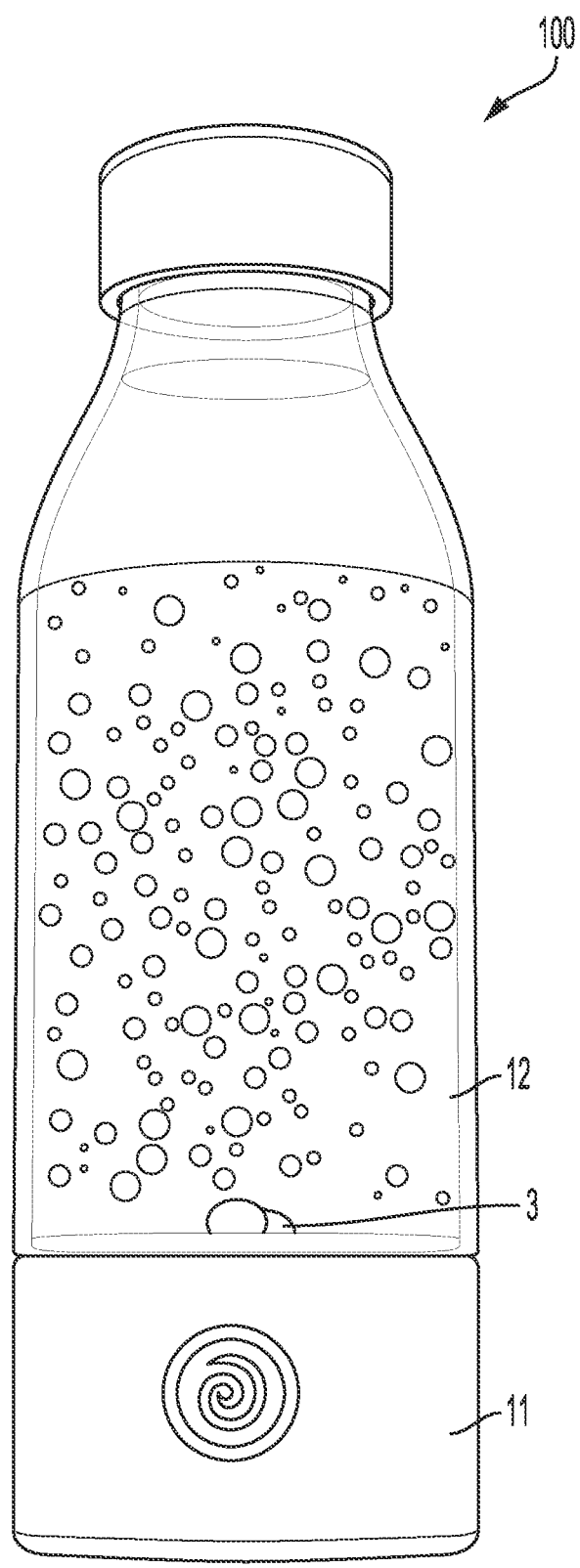
FIG. 5 shows a front view of a refillable carbonation container, in accordance with one or more implementations.

Container 100 may be configured to operate in at least two different modes of operation, including a ready-for-carbonation mode of operation and at least one carbonation mode of operation. Container 100 may transition between different modes of operation, e.g., responsive to receiving user input through control interface 19 and/or based on operations and/or control by control circuitry 17. For example, in the ready-for-carbonation mode of operation, tank 5 may hold $CO_2$, and dispenser 3 may be inactive, i.e., not dispensing the $CO_2$ from tank 5 into (the liquid in) container body 12. For example, in at least one carbonation mode of operation, tank 5 may hold $CO_2$, and dispenser 3 may be active, i.e., dispensing the $CO_2$ from tank 5 into (the liquid in) container body 12. By way of non-limiting example, FIG. 5 shows a front view of refillable carbonation container 100, after carbonation. For example, container 100 as depicted in FIG. 5 may include a solution of pressurized liquid (e.g., $CO_2$) and potable liquid (e.g., water) that has been created through carbonation (as depicted by the bubbles in FIG. 5).

Base 11 may include one or more of tank 5, conduit 6, valve 7, control circuitry 17, rechargeable battery 15, electrical motor 18, control interface 19, and/or other components. In some implementations, base 11 may include dispenser 3. In other implementations, container body 12 may include dispenser 3.

Container body 12 may be configured to hold a volume of liquid, including but not limited to potable liquid such as water. In some implementations, the volume may range between 12 and 48 ounces. Container body 12 may include a proximal end 21, a distal end 22, a cap 24, and/or other components. Proximal end 21 of container body 12 may be disposed near dispenser 3 during operation of container 100. Distal end 22 of container body 12 may be disposed opposite proximal end 21. In some implementations, proximal end 21 may be at or near at least one of base 11 and tank 5 during carbonation of the liquid held in container body 12. Container body 12 has a longitudinal axis 12a extending through proximal end 21 and distal end 22. In some implementations, container body 12 may have a diameter ranging between 2 and 5 inches.

Tank 5 may be configured to hold a pressurized liquid, such as $CO_2$ gas, at a pressure level higher than atmosphere (in some cases, the pressure level may be greater than 101 kPa, or greater than 110 kPa). Tank 5 may be a tank, reservoir, container, cartridge, and/or other type of housing. Tank 5 may be a pressurized tank. In some implementations, tank 5 may be refillable. Alternatively, and/or simultaneously, tank 5 may be user replaceable. Tank 5 has a particular volume, such that tank 5 can hold an amount of pressurized liquid that is sufficient to support at least multiple separate and distinct instances of the carbonation of liquid held in container body 12. As a result, the user can control carbonating at least multiple times the volume of liquid in container body 12 using the amount of pressurized liquid held in the volume of tank 5. In some implementations, tank 5 holds enough pressurized liquid for at least three instances of the carbonation of liquid held in container body 12. In some implementations, tank 5 holds enough pressurized liquid for at least ten instances of the carbonation of liquid held in container body 12. In some implementations, tank 5 holds enough pressurized liquid for at least twenty instances of the carbonation of liquid held in container body 12. In some implementations, tank 5 holds enough pressurized liquid to support between five and ten instances of the carbonation of liquid held in container body 12. In some implementations, tank 5 holds enough pressurized liquid to support between ten and twenty instances of the carbonation of liquid held in container body 12. In some implementations, carbonation is performed such that the liquid held in container body 12 includes about 2-3 grams of carbonic acid ($H_2CO_3$) per liter. In some implementations, the particular volume of tank 5 is between 6 and 8 grams of $CO_2$ per liter of liquid held in container body 12, multiplied by the number of instances of carbonation that are supported. By way of non-limiting example, for a 1-liter container body 12, tank 5 may hold between 18 and 24 grams of $CO_2$ to support carbonating container 100 three times. By way of non-limiting example, for a 1-liter container body 12, tank 5 may hold between 30 and 40 grams of $CO_2$ to support carbonating container 100 five times, and twice as much to support carbonating container 100 ten times, before needing to be refilled or replaced.

In some implementations, tank 5 may be included in base 11 such that tank 5 forms an integrated whole with base 11 and/or other components. In such cases, tank 5 may be non-user-removable. In some implementations, tank 5 may include one or more conduits, connectors, valves, and/or other components configured to couple tank 5 to other components of container 100 (such as, by way of non-limiting example, to dispenser 3).

Dispenser 3 may be configured to rotate around a rotational axis during the carbonation of liquid held in container body 12. In some implementations, dispenser 3 may rotate around a shaft (not depicted) mounted to the top surface of base 11, e.g., in the center of the top surface of base 11. In some implementations, (rotatable) dispenser 3 is disposed at or near proximal end 21 of container body 12. In some implementations, the rotational axis of dispenser 3 may coincide with longitudinal axis 12a of container body 12. Dispenser 3 may include at least one outlet 4. In some implementations, dispenser 3 may include two or more outlets 4.

One or more outlets 4 may be configured such that liquid can exit out of dispenser 3 through one or more outlets 4. In particular, pressurized liquid from tank 5, upon exiting out of one or more outlets 4, may carbonate (or provide carbonation of) liquid held in container body 12. By virtue of pressurized liquid exiting one or more outlets 4, a solution of pressurized liquid (e.g., $CO_2$) and potable liquid (e.g., water) may be created within container body 12. In some implementations, at least one outlet 4 may be disposed at least a predetermined distance from the rotational axis of dispenser 3 (e.g., longitudinal axis 12a of container body 12). In some implementations, this predetermined distance may be about 10 mm. In some implementations, this predetermined distance may be between 5 mm and 15 mm. In some implementations, this predetermined distance may be about half an inch. In some implementations, this predetermined distance may be between 0.25 inches and 1.5 inches. For example, in the case that the predetermined distance is 10 mm, the at least one outlet 4 may move in a circle during rotation of dispenser 3 such that the circle has a diameter of 20 mm.

Figure 4:
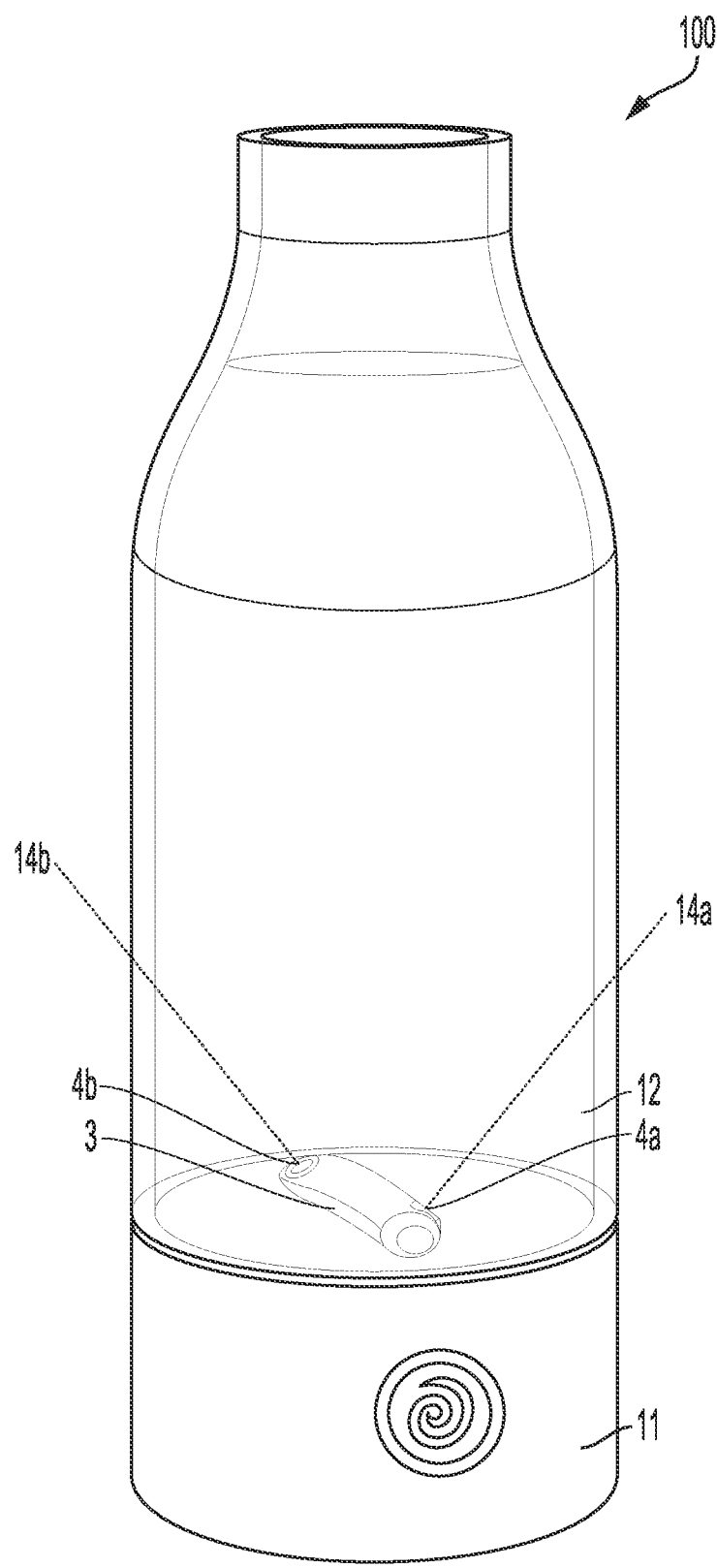
FIG. 4 shows an elevated front view of a refillable carbonation container, in accordance with one or more implementations.
Figure 6:
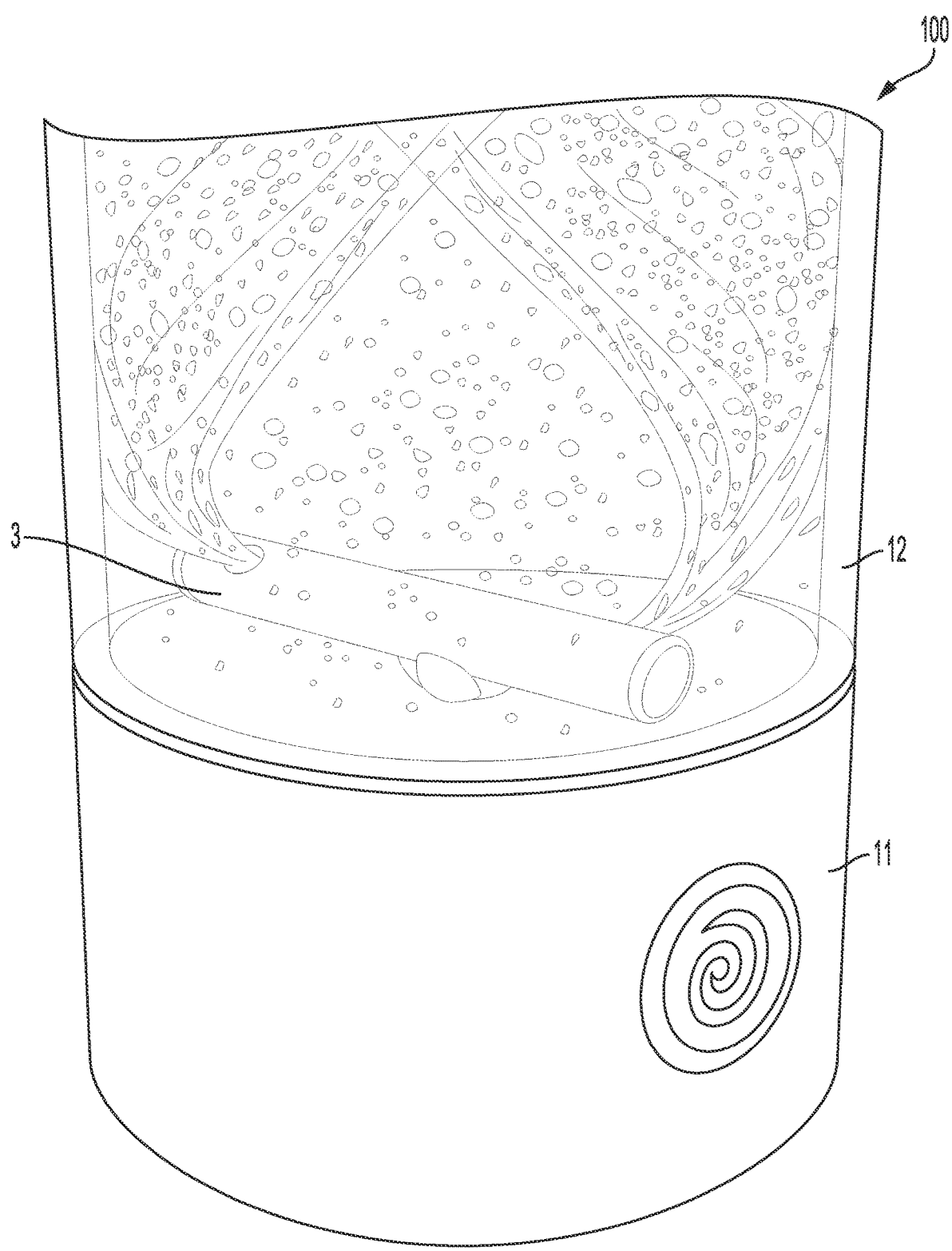
FIG. 6 shows a partial perspective view of a refillable carbonation container, in accordance with one or more implementations.

In some implementations, dispenser 3 includes two outlets 4 disposed at opposite ends of dispenser 3, including a first outlet 4a and a second outlet 4b (as depicted in FIG. 4 which shows an elevated front view of refillable carbonation container 100). First outlet 4a of dispenser 3 may have (or point in) a first direction 14a. Second outlet 4b of dispenser 3 may have (or point in) a second direction 14b (as depicted in FIG. 4). In some implementations, first direction 14a may be different from second direction 14b. In some implementations, first direction 14a may be opposite from second direction 14b. In some implementations, the angle between first direction 14a and second direction 14b may be a predetermined angle. This predetermined angle may be about 60 degrees, about 90 degrees, about 120 degrees, about 180 degrees, and/or another number of degrees. In some implementations, this predetermined angle may range between 45 and 60 degrees, between 60 and 90 degrees, between 90 and 120 degrees, between 120 and 180 degrees, and/or have another range of degrees. In some implementations, one or both of first direction 14a and second direction 14b may be angled upward as depicted in FIG. 4. By way of non-limiting example, first direction 14a and second direction 14b may be angled upward at different degrees angles as measured against the bottom of container body 12. In some implementations, first direction 14a and second direction 14b may be angled upward at different angles between 30 and 60 degrees as measured against the bottom of container body 12. In some implementations, a first flow of pressurized liquid may flow through first outlet 4a, and a second flow of pressurized liquid may flow through second outlet 4b. In some implementations, the first flow and the second flow may occur at the same time. In some implementations, the first flow and the second flow may provide a motive force for the rotation of dispenser 3. In some implementations, the rotation of dispenser 3 may be powered by pressurized liquid exiting from one or more outlets 4 of dispenser 3. By way of non-limiting example, FIG. 6 shows a partial perspective view of refillable carbonation container 100 (including dispenser 3 with two outlets) from an elevated angle, during carbonation. As depicted, dispenser 3 is spinning clockwise (when viewed from above) around its centrally located point of engagement with the bottom of container body 12 and/or the top of base 11, and dispensing $CO_2$ from two outlets into the liquid in container body 12.

Conduit 6 may be configured to provide a fluid path between tank 5 and dispenser 3. In some implementations, conduit 6 may be configured to couple tank 5 to dispenser 3. In some implementations, container 100 may include multiple conduits. For example, multiple conduits may together provide a path between tank 5 and at least one outlet 4. In some implementations, conduit 6 may include a (controllable) valve to control transfer of pressurized liquid through conduit 6.

Valve 7 may be configured to control transfer of pressurized liquid in tank 5 to at least one outlet 4 of dispenser 3. In some implementations, valve 7 may be a controllable valve. In some implementations, operation of valve 7 may be based at least in part on user input received through control interface 19. Alternatively, and/or simultaneously, operation of valve 7 may be controlled at least in part by control circuitry 17. In some implementations, opening and closing of valve 7 may be controlled through mechanical operations, e.g., initiated by a user pressing control interface 19, and, e.g., halted due to pressure changes within container body 12 and/or due to pressure from a spring closing valve 7.

In some implementations, container 100 may include electrical motor 18 configured to rotationally drive dispenser 3. In some implementations, electrical motor 18 may operate at a voltage between 5V and 10V. In one or more preferred implementations, electrical motor 18 may operate at a voltage of about 7.4V. Electrical motor 18 may be configured to be powered by rechargeable battery 15. Simultaneously, in some implementations, electrical motor 18 may be further configured to be powered through a standardized charging interface (not depicted). In one or more preferred implementations, no power is (or need be) supplied to container 100 from an external power source during operation of container 100. In some implementations, control circuit 17 may be configured to control electrical motor 18 during operation. For example, control circuit 17 may selectively control the rotation of dispenser 3 during operation of container 100. In some implementations, electrical motor 18 may be integrated into base 11.

In some implementations, container 100 may include rechargeable battery 15 configured to power electrical motor 18 and/or other operations of container 100. In some implementations, rechargeable battery 15 may be configured to power electrical motor 18 such that, during carbonation by container 100, no power is supplied to electrical motor 18 from an external power source. In some implementations, rechargeable battery 15 may be non-removable. As used herein, the term "non-removable" may mean not accessible to users during common usage of container 100, including carbonation, charging, and storing for later use. In some implementations, rechargeable battery 15 may be not user replaceable. In some implementations, rechargeable battery 15 may be user replaceable. In some implementations, rechargeable battery 15 may be store-bought. In some implementations, rechargeable battery 15 may have a capacity between 500 mAh and 4000 mAh. In some implementations, rechargeable battery 15 may have a capacity between 300 mAh and 1000 mAh. In some implementations, control circuit 17 may be configured to control charging of rechargeable battery 15. For example, control circuit 17 may control the transfer of electrical power through a charging interface into rechargeable battery 15. For example, responsive to a detection that rechargeable battery 15 is fully charged, control circuit 17 may prevent the transfer of electrical power into rechargeable battery 15. In some implementations, rechargeable battery 15 may be integrated into base 11.

Control circuitry 17 may be configured to control different functions and/or operations of container 100, including but not limited to turning container 100 on and off, transitioning between different modes of operation, charging of rechargeable battery 15, controlling of electrical motor 18 regarding and/or during rotation of dispenser 3, determining whether one or more mechanical couplings 16 are engaged properly for operation, controlling operation of control interface 19, detecting user input received through control interface 19, and/or performing other functions for container 100. In some implementations, control circuitry 17 may be configured to prevent rotation of dispenser 3 (or operation of valve 7) responsive to a determination that one or more mechanical couplings 16 are not engaged (or not engaged properly for the intended operation of container 100). In some implementations, control circuitry 17 may be configured to convey information regarding the operational status of container 100 to a user by controlling control interface 19. For example, control interface 19 may include a light that can illuminate in various colors and/or patterns. In some implementations, control circuitry 17 may be implemented as a printed circuit board (PCB). In some implementations, control circuitry 17 may be integrated into base 11.

In some implementations, control circuitry 17 may be configured to provide the timing for starting and stopping the dispensing of pressurized liquid through dispenser 3 and/or the opening and closing of valve 7. For example, control circuitry 17 may include an electrical timer. In some implementations, control circuitry 17 may be configured to provide the timing for starting and stopping the rotation of dispenser 3. In some implementations, a single press of the button of control interface 19 may initiate the carbonation for a particular duration. The particular duration may last longer than the single press. The particular duration may be about 5 seconds, about 10 seconds, about 20 seconds, about 30 seconds, about 40 seconds, about 1 minute, about 2 minutes, between 5 and 15 seconds, between 20-40 seconds, between 30-45 seconds, and/or another duration.

Control interface 19 may be configured to receive user input from a user. Control interface 19 may be part of the user interface of container 100. For example, control interface 19 may be configured to be engaged manually by the user. In some implementations, control interface 19 may include a button. For example, the user can press the button to turn carbonation on and/or off. In some implementations, control interface 19 may include a touchscreen (not depicted). For example, the user can touch the touchscreen to provide the user input. In some implementations, control interface 19 may support multiple types of manual engagement (e.g., including gestures by the user), including but not limited to a first type of manual engagement, a second type of manual engagement, a third type of manual engagement, and so forth. In some implementations, control interface 19 may be configured to facilitate transitions between different modes of operation of refillable carbonation container 100. Control interface 19 may convey information regarding the operational status of container 100 to a user (e.g., the current mode of operation). In some implementations, the operation status of container 100 may be determined and/or detected by control circuitry 17. Control interface 19 may be controlled by control circuitry 17. In some implementations, threaded couplings between base 11 and container body 12 may need to be tightened sufficiently for proper operation, and control interface 19 may warn the user when the treaded couplings are not tightened sufficiently.

Referring to FIG. 1, in some implementations, base 11 may have a cylindrical shape. For example, horizontal cross-sections of base 11 may have a circular shape. In some implementations, the cylindrical shape of base 11 may have a diameter between 2 and 5 inches, which may be referred to as a base diameter. In some implementations, the cylindrical shape of base 11 may have a base diameter between 3 and 3.5 inches. Such a base diameter may improve portability, as well as allow container 100 to be stored in a cup holder, e.g., in a vehicle.

Figure 3A:
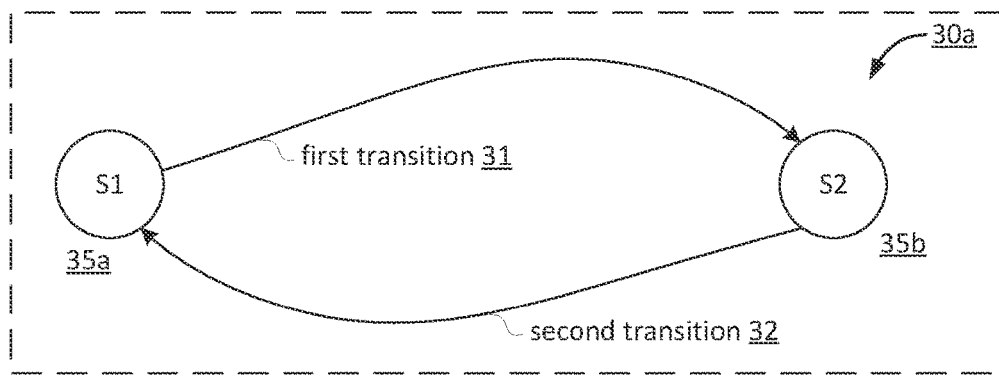
FIGS. 3A-3B-3C-3D illustrate state transitions in state diagrams as may be used by a refillable carbonation container, in accordance with one or more implementations.

By way of non-limiting example, FIG. 3A illustrates state transitions in a state diagram 30a as may be used by container 100, e.g., responsive to different types of detections regarding control interface 19 being manipulated by a user as described elsewhere in this disclosure. As depicted, state diagram 30a may include a first state 35a (labeled "S1") and a second state 35b (labeled "S2"). First state 35a may correspond to a ready-for-carbonation mode of container 100. Second state 35b may correspond to a first carbonation mode of operation of container 100. As depicted here, a first transition 31 may transition the mode of operation of container 100 from first state 35a to second state 35b. A second transition 32 may transition the mode of operation of container 100 from second state 35b to first state 35a. First transition 31 may occur responsive to detection of the first type of detections. Second transition 32 may occur automatically, e.g., after completion of a first carbonation operation.

Figure 3B:
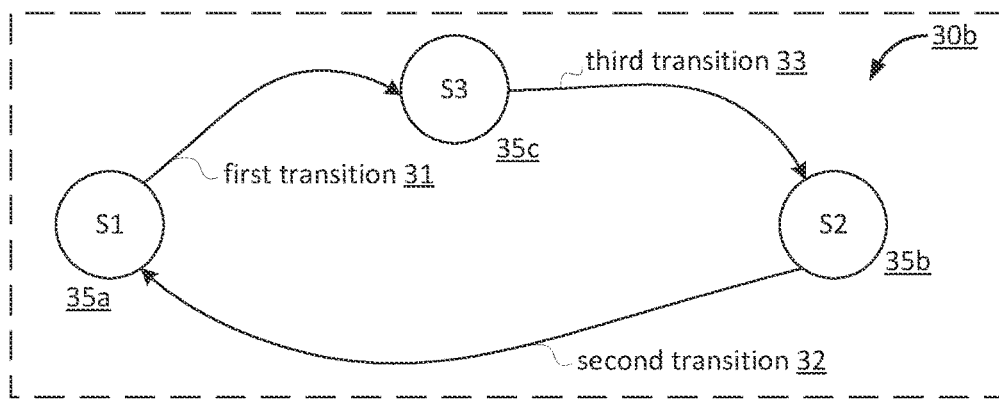

By way of non-limiting example, FIG. 3B illustrates state transitions in a state diagram 30b as may be used by container 100, e.g., responsive to different types of detections regarding control interface 19 being manipulated by a user as described elsewhere in this disclosure. As depicted, state diagram 30b may include a first state 35a (labeled "S1"), a second state 35b (labeled "S2"), and a third state 35c (labeled "S3"). First state 35a may be similar as described regarding FIG. 3A. Second state 35b may correspond to a warning mode of operation of container 100. Third state 35c may correspond to a carbonation mode of operation of container 100. As depicted in state diagram 30b, a first transition 31 may transition the mode of operation of container 100 from first state 35a to third state 35c. A second transition 32 may transition the mode of operation of container 100 from second state 35b to first state 35a. A third transition 33 may transition the mode of operation of container 100 from third state 35c to second state 35b. First transition 31 may occur responsive to detection of a particular type of detections. Third transition 33 may occur responsive to detection of an error condition. Second transition 32 may occur automatically.

Figure 3C:
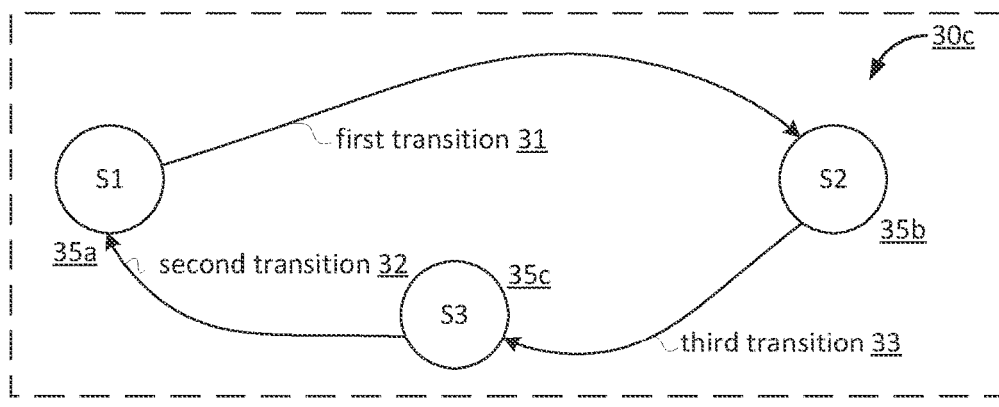

By way of non-limiting example, FIG. 3C illustrates state transitions in a state diagram 30c as may be used by container 100, e.g., responsive to different types of detections regarding control interface 19 being manipulated by a user as described elsewhere in this disclosure. As depicted, state diagram 30b may include a first state 35a (labeled "S1"), a second state 35b (labeled "S2"), and a third state 35c (labeled "S3"). First state 35a may correspond to a carbonation mode of operation. Second state 35b may correspond to a different mode of operation of container 100 in which the user can interact and/or modify settings of container 100. Third state 35c may correspond to a warning or error mode of operation of container 100. As depicted in state diagram 30b, a first transition 31 may transition the mode of operation of container 100 from first state 35a to second state 35b. A second transition 32 may transition the mode of operation of container 100 from second state 35b back to first state 35a. A third transition 33 may transition the mode of operation of container 100 from first state 35a to third state 35c. Different transitions may occur responsive to particular types of detections or errors.

Figure 3D:
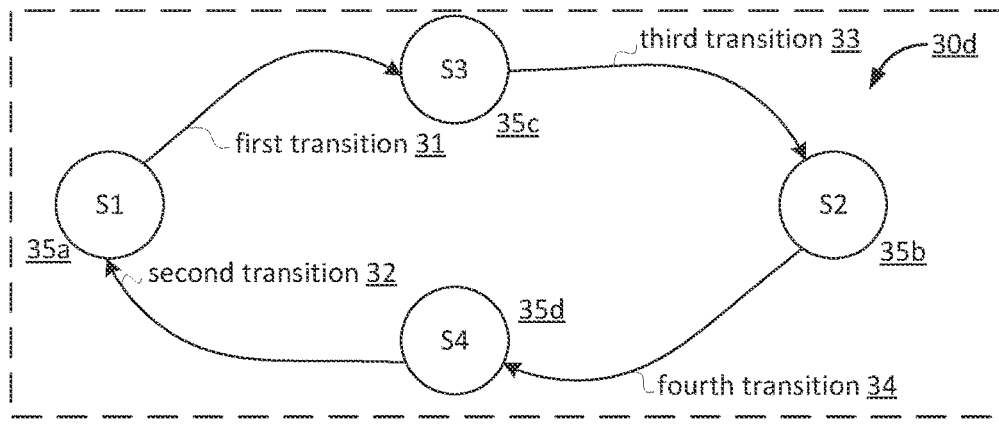

By way of non-limiting example, FIG. 3D illustrates state transitions in a state diagram 30d as may be user by container 100, e.g., responsive to different types of detections regarding control interface 19 being manipulated by a user as described elsewhere in this disclosure. As depicted, state diagram 30b may include a first state 35a (labeled "S1"), a second state 35b (labeled "S2"), a third state 35c (labeled "S3"), and a fourth state 35d (labeled "S4"). Multiple depicted states may correspond to different modes of operation. At least one of the depicted states may correspond to a carbonation mode of operation. Different states may correspond to different presentations or displays being presented on control interface 19. Different transitions may affect both the depicted states and the presented displays.

Referring to FIG. 1, cap 24 may be disposed at or near distal end 22 of container body 12. Cap 24 may be removable, as depicted in FIG. 4. For example, removing cap 24 may create an opening at distal end 22 of container body 12, e.g., for drinking.

Figure 2:
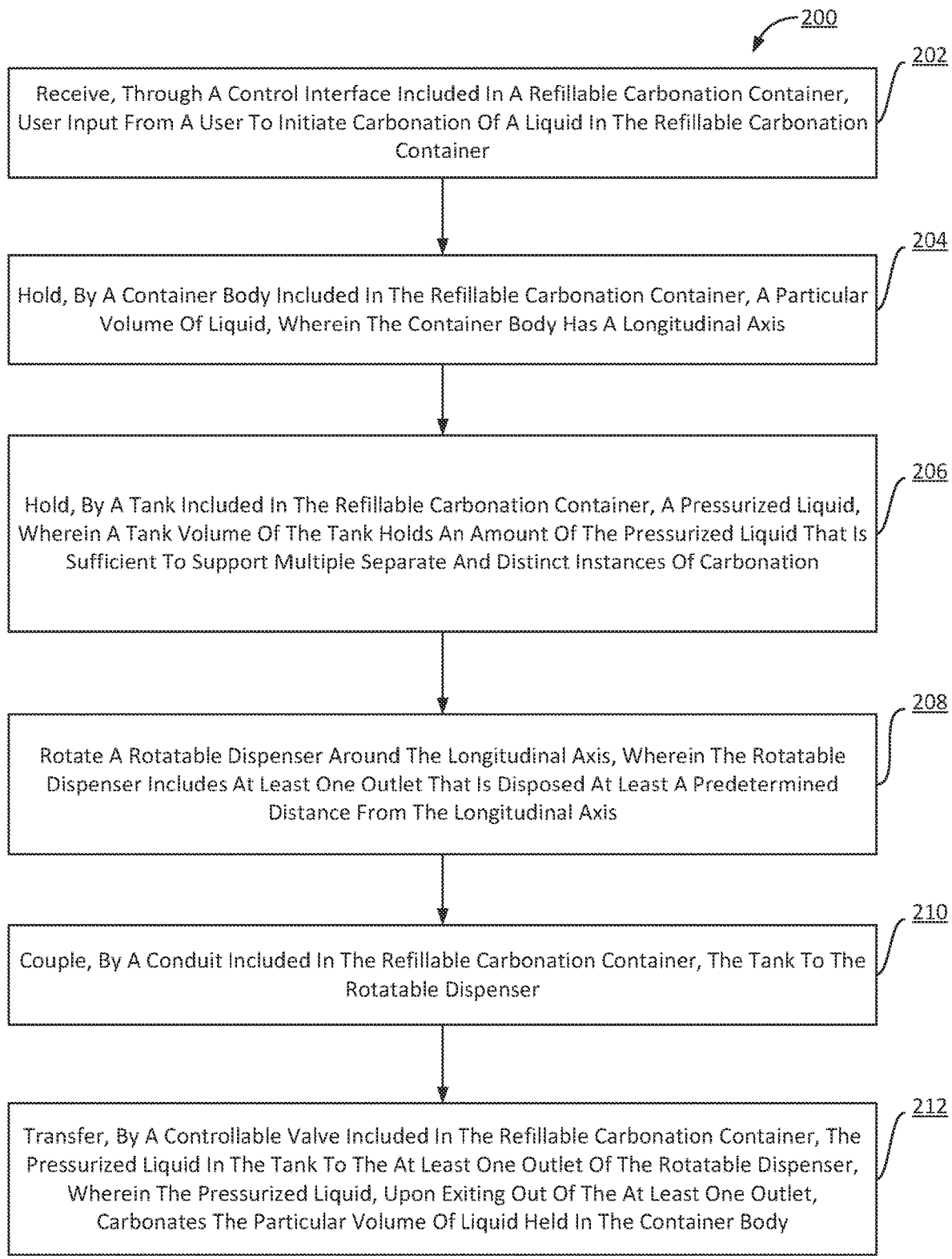
FIG. 2 shows a method for controlling operations of a refillable carbonation container, in accordance with one or more implementations.

FIG. 2 illustrates a method 200 of holding and carbonating liquid in a refillable carbonation container, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented using one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, user input is received, through a control interface included in the refillable carbonation container, from a user to initiate carbonation of the liquid in the refillable carbonation container. In some embodiments, operation 202 is performed by a control interface the same as or similar to control interface 19 (shown in FIG. 1 and described herein).

At an operation 204, a particular volume of liquid is held, by a container body included in the refillable carbonation container. The container body has a longitudinal axis. In some embodiments, operation 204 is performed by a container body the same as or similar to container body 12 (shown in FIG. 1 and described herein).

At an operation 206, a pressurized liquid is held, by a tank included in the refillable carbonation container. The tank has a tank volume. The tank volume of the tank holds an amount of the pressurized liquid that is sufficient to support at least three separate and distinct instances of the carbonation, such that the user can control carbonating at least three times the particular volume of liquid using the amount of pressurized liquid held in the tank volume of the tank. In some embodiments, operation 206 is performed by a tank the same as or similar to tank 5 (shown in FIG. 1 and described herein).

At an operation 208, a rotatable dispenser is rotated around the longitudinal axis. The rotatable dispenser includes at least one outlet that is disposed at least 10 mm from the longitudinal axis such that the at least one outlet moves in a circle during rotation of the rotatable dispenser. The circle has a diameter of at least 20 mm. In some embodiments, operation 208 is performed by a (rotatable) dispenser the same as or similar to rotatable dispenser 3 (shown in FIG. 1 and described herein).

At an operation 210, the tank is coupled to the rotatable dispenser, by a conduit included in the refillable carbonation container. In some embodiments, operation 210 is performed by a conduit the same as or similar to conduit 6 (shown in FIG. 1 and described herein).

At an operation 212, the pressurized liquid in the tank is transferred, by a controllable valve included in the refillable carbonation container, to the at least one outlet of the rotatable dispenser. The pressurized liquid, upon exiting out of the at least one outlet, carbonates the particular volume of liquid held in the container body, thereby creating a solution within the container body of the pressurized liquid and the liquid. In some embodiments, operation 212 is performed by a (controllable) valve the same as or similar to valve 7 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A refillable carbonation container configured to hold and carbonate liquids, the refillable carbonation container comprising:
    a base including a control interface configured to receive user input from a user;
    a tank configured to hold a pressurized liquid, wherein the tank is one or both of refillable and/or user-replaceable, wherein the tank has at least a first volume;
    a container body configured to hold a second volume of liquid, wherein the container body has a proximal end at or near at least one of the base and the tank during carbonation of liquid held in the container body, wherein the container body has a distal end opposite the proximal end, and wherein the container body has a longitudinal axis extending through the proximal end and the distal end;
    a rotatable dispenser disposed at or near the proximal end of the container body during the carbonation of the liquid held in the container body, wherein the rotatable dispenser includes at least one outlet, wherein the rotatable dispenser is configured to rotate around the longitudinal axis during the carbonation of the liquid held in the container body;
    a conduit configured to couple the tank to the rotatable dispenser; and a controllable valve configured to control transferring the pressurized liquid in the tank to the at least one outlet of the rotatable dispenser, wherein operation of the controllable valve is based at least in part on the user input received through the control interface;

wherein the pressurized liquid, upon exiting out of the at least one outlet, carbonates the liquid held in the container body, thereby creating a solution within the container body of the pressurized liquid and the liquid, wherein the tank is configured such that the first volume of the tank holds an amount of the pressurized liquid that is sufficient to support at least three separate and distinct instances of the carbonation of the liquid held in the container body, such that the user can control carbonating at least three times the second volume of liquid using the amount of pressurized liquid held in the first volume of the tank.

2. The refillable carbonation container of claim 1, wherein the pressurized liquid includes CO2.

3. The refillable carbonation container of claim 1, wherein the container body is configured to removably engage with the base of the refillable carbonation container through one or more threaded couplings.

4. The refillable carbonation container of claim 1, wherein the tank is included in the base such that the tank forms an integrated whole with the base.

5. The refillable carbonation container of claim 1, wherein the control interface includes a button configured to be pressed by the user, wherein a single press of the button initiates the carbonation for a first duration, wherein the first duration is longer than the single press.

6. The refillable carbonation container of claim 1, wherein the rotatable dispenser includes two outlets at opposite ends of the rotatable dispenser, including a first outlet and a second outlet, wherein the first outlet has a first direction and the second outlet has a second direction, and wherein the first direction is different from the second direction.

7. The refillable carbonation container of claim 6, wherein the rotatable dispenser is configured such that a first flow of the pressurized liquid flows through the first outlet in the first direction and a second flow of the pressurized liquid flows through the second outlet in the second direction, wherein the first flow and the second flow occur at the same time, and wherein a motive force of the rotation of the rotatable dispenser is provided by the first flow and the second flow of the pressurized liquid.

8. The refillable carbonation container of claim 1, wherein the rotation of the rotatable dispenser is powered by the pressurized liquid exiting from the at least one outlet of the rotatable dispenser.

9. The refillable carbonation container of claim 1, further including:
control circuitry configured to control the operation of the controllable valve, based at least in part on the user input received through the control interface.

10. The refillable carbonation container of claim 1, further including:
an electrical motor configured to drive the rotation of the rotatable dispenser;
a rechargeable battery configured to power the electrical motor, and
control circuitry configured to control the electrical motor based on the user input received through the control interface.

11. The refillable carbonation container of claim 1, wherein the second volume of liquid is between 12 and 48 ounces.

12. The refillable carbonation container of claim 1, wherein the container body has a diameter between 2 and 5 inches.

13. The refillable carbonation container of claim 1, wherein the at least one outlet is disposed at least 10 mm from the longitudinal axis such that the at least one outlet moves in a circle during rotation of the rotatable dispenser, wherein the circle has a diameter of at least 20 mm.

14. A method of holding and carbonating liquid in a refillable carbonation container, the method comprising:
receiving, through a control interface included in the refillable carbonation container, user input from a user to initiate carbonation of the liquid in the refillable carbonation container;
holding, by a container body included in the refillable carbonation container, a particular volume of liquid, wherein the container body has a longitudinal axis;
holding, by a tank included in the refillable carbonation container, a pressurized liquid, wherein the tank has a tank volume, wherein the tank volume of the tank holds an amount of the pressurized liquid that is sufficient to support at least three separate and distinct instances of the carbonation, such that the user can control carbonating at least three times the particular volume of liquid using the amount of pressurized liquid held in the tank volume of the tank;
rotating a rotatable dispenser around the longitudinal axis, wherein the rotatable dispenser includes at least one outlet;
coupling, by a conduit included in the refillable carbonation container, the tank to the rotatable dispenser; and
transferring, by a controllable valve included in the refillable carbonation container, the pressurized liquid in the tank to the at least one outlet of the rotatable dispenser, wherein the pressurized liquid, upon exiting out of the at least one outlet, carbonates the particular volume of liquid held in the container body, thereby creating a solution within the container body of the pressurized liquid and the liquid.

15. The method of claim 14, wherein the rotatable dispenser includes a first outlet having a first direction and a second outlet having a second direction, wherein the first direction is different from the second direction, wherein transferring the pressurized liquid includes:
effectuating a first flow of the pressurized liquid through the first outlet in the first direction;
effectuating a second flow of the pressurized liquid through the second outlet in the second direction, wherein the first flow and the second flow occur at the same time; and
providing a motive force of the rotation of the rotatable dispenser by the first flow and the second flow of the pressurized liquid.

16. The method of claim 15, further comprising:
controlling operation of the controllable valve based at least in part on the user input received through the control interface.

17. The method of claim 14, wherein the at least one outlet is disposed at least 10 mm from the longitudinal axis such that the at least one outlet moves in a circle during rotation of the rotatable dispenser, wherein the circle has a diameter of at least 20 mm.

* * * * *